(12) United States Patent
Hamann et al.

(10) Patent No.: US 8,648,141 B2
(45) Date of Patent: Feb. 11, 2014

(54) STYRENE BUTADIENE RUBBER WITH NOVEL STYRENE INCORPORATION

(75) Inventors: Evemarie Hamann, Halle (DE); Hagen Thomas Bartossek, Schkopau (DE); Joachim Kiesekamp, Hannover (DE)

(73) Assignee: Styron Europe GmbH, Horgen (CH)

( * ) Notice: Subject to any disclaimer, the term of this patent is extended or adjusted under 35 U.S.C. 154(b) by 252 days.

(21) Appl. No.: 13/255,756

(22) PCT Filed: Feb. 24, 2010

(86) PCT No.: PCT/US2010/025150
§ 371 (c)(1),
(2), (4) Date: Sep. 9, 2011

(87) PCT Pub. No.: WO2010/107555
PCT Pub. Date: Sep. 23, 2010

(65) Prior Publication Data
US 2012/0010356 A1    Jan. 12, 2012

Related U.S. Application Data

(60) Provisional application No. 61/161,680, filed on Mar. 19, 2009.

(51) Int. Cl.
C08K 3/34 (2006.01)
C08L 25/00 (2006.01)

(52) U.S. Cl.
USPC .......................................... 524/493; 524/575

(58) Field of Classification Search
USPC ....................................................... 524/493
See application file for complete search history.

(56) References Cited

U.S. PATENT DOCUMENTS

| | | | |
|---|---|---|---|
| 3,094,512 A | 6/1963 | Short | |
| 4,396,743 A | 8/1983 | Fujimaki et al. | |
| 4,843,120 A | 6/1989 | Halasa et al. | |
| 4,845,154 A | 7/1989 | Blythe et al. | |
| 4,948,849 A | 8/1990 | Blythe et al. | |
| 4,950,719 A | 8/1990 | Oyama et al. | |
| 5,011,888 A | 4/1991 | Tsutsumi et al. | |
| 5,137,998 A | 8/1992 | Hsu et al. | |
| 6,372,863 B1 | 4/2002 | Kerns et al. | |
| 6,903,155 B2 | 6/2005 | Hodge | |
| 7,005,469 B2 | 2/2006 | Fusamae et al. | |

FOREIGN PATENT DOCUMENTS

| | | | |
|---|---|---|---|
| CN | 101319064 A | 12/2008 | |
| EP | 0 263 054 A2 | 4/1988 | |
| EP | 0 483 046 A1 | 4/1992 | |
| EP | 0 530 795 A1 | 3/1993 | |
| EP | 1 637 353 A1 | 3/2006 | |
| GB | 903331 | 8/1962 | |
| GB | 994726 | 6/1965 | |
| GB | 1 387 920 | 3/1975 | |
| GB | 2 110 695 A | 6/1983 | |
| GB | 2 158 076 A | 11/1985 | |
| GB | 2158076 A * | 11/1985 | ............ C08F 297/04 |
| JP | 62-101638 | 5/1987 | |
| WO | WO 02/064636 | 8/2002 | |

OTHER PUBLICATIONS

Notification of the First Office Action, Chinese Patent Application No. 201080010578.5, dated May 28, 2013 p. 1-16, State Intellectual Property Office of the People's Republic of China, China.
PCT Search Report mailed Jul. 21, 2010 for corresponding PCT Application No. PCT/US2010/025150.
Krause, Sonja, *Polymer-Polymer Miscibility*, "Pure & Applied Chem.", vol. 58, No. 12, pp. 1553-1560, 1986.
Schuster et al., *Selective Interactions in Elastomers, a Base for Compatibility and Polymer-Filler Interactions*, "Rubber Chem. Technol.," vol. 69, No. 5, pp. 769, Nov.-Dec. 1996.
First Office Action dated Aug. 6, 2013 of corresponding Japanese patent application No. 2012-500814 (10 pages including English translation).

\* cited by examiner

*Primary Examiner* — Hui Chin
(74) *Attorney, Agent, or Firm* — Brinks, Gilson & Lione

(57) ABSTRACT

The present invention relates to improved compositions of SSBR rubber. The improved compositions exhibit sufficient or improved balance of characteristics such as rolling resistance, HBU, abrasion, grip, and/or tear. The compositions may be made in an efficient, cost-effective manner.

17 Claims, 3 Drawing Sheets

| PEAK # | RET TIME [min] | TYPE | WIDTH [min] | AREA [nRIU*s] | HEIGHT [nRIU] | AREA % |
|---|---|---|---|---|---|---|
| 1 | 17.640 | PV | 0.7481 | 1.84576e5 | 3481.89185 | 22.6771 |
| 2 | 19.142 | VB | 0.5923 | 6.29356e5 | 1.52979e4 | 77.3229 |

STYRENE BUTADIENE RUBBER WITH NOVEL STYRENE INCORPORATION

This application is a National Stage of International Application PCT/US2010/025150 filed Feb. 24, 2010 which claims the benefit of the filing date under 35 U.S.C. §119(e) of U.S. Provisional Application No. 61/161,680, filed on Mar. 19, 2009. The entirety of both applications is hereby incorporated by reference.

FIELD OF THE INVENTION

This invention relates to an improved styrene butadiene rubber comprising a high styrene portion and a low styrene portion.

BACKGROUND AND SUMMARY OF THE INVENTION

Compositions comprising solution styrene butadiene rubber (SSBR) are used in such items as tire treads often in combination with a second rubber such as cis-butadiene rubber (BR) or natural rubber (NR). The characteristics of the compositions such as heat build up (HBU), rolling resistance, grip, and/or tear are believed to be heavily influenced by the composition of the SSBR, e.g., the styrene and vinyl content of the incorporated butadiene. Typically, an increase in styrene content, vinyl content, or both may improve properties like grip, tear, and/or braking performance but worsen properties like HBU, rolling resistance and/or abrasion resistance.

Various methods and compositions have been tried in attempts to alter the resulting polymer and improve characteristics such as wet grip and abrasion balance. As EP1637353 describes, mixtures of oil extended high styrene, low vinyl SSBR with cis polybutadiene, silica, processing oil and organosilicon compounds may be used in an attempt to balance these properties. However, additional compounds are still needed which have improved grip and rolling resistance behavior when combined with natural rubber and/or carbon black as filler.

DE3108583 proposes to polymerize styrene and butadiene in such a way that a part of the monomers with a higher ratio of styrene than the final ratio of the target polymer is put into the reaction zone containing solvent. Simultaneously, a styrene/butadiene mixture containing the same or lower weight ratio of styrene than the targeted polymer is charged over a certain time to the reaction zone. The resulting polymer is coupled with a di-functional coupling agent. The coupling efficiency is about 50%. Unfortunately, the resulting polymer has a higher styrene content on the chain ends and a lower styrene content in the middle of the polymer chain. Such styrene blocks often result in deficient HBU and rolling resistance properties.

DE2247470 proposes using a dilithio initiator and charging the monomer mixture to the reaction zone at a higher or equal rate than the polymerization growth rate. Unfortunately, such dilithio initiators are not cost-effective and the resulting polymer often has small styrene blocks on the end of the polymer chain. Such blocks may result in insufficient rolling resistance and/or HBU.

In DE1300239 a faster reacting monomer is charged to a reaction zone which contains an initiator, solvent, and a monomer mixture consisting of a specific ratio of both monomers which is maintained during the polymerization. Unfortunately, the resulting polymer has a styrene content which is only slightly increased during the long polymerization time.

Accordingly, improved compositions of SSBR compositions are needed. It would be desirable if such improved compositions exhibit sufficient or improved balance of characteristics such as rolling resistance, HBU, abrasion, grip, and/or tear. It would further be desirable if such compositions could be made in an efficient, cost-effective manner.

Advantageously, improved compositions of SSBR and methods of making them have been discovered that meet many of the aforementioned needs and also have other desirable characteristics.

In one embodiment, a composition of the present invention comprises a styrene butadiene rubber. The styrene butadiene rubber is characterized before any vulcanization by one or more of the following: (a) two or more portions in one polymer chain which are incompatible with each other; or (b) two or more glass transition temperatures that vary by at least about 6° C.; or (c) two or more δ (SBR) values which differ by at least more than about 0.65 $(J/cm^3)^{0.5}$; or (d) two or more portions which vary in styrene content by at least about 20 weight percent based on the total weight of rubber. The styrene butadiene rubber comprises at least a portion which is compatible with a second rubber (e.g., a rubber used in a tire tread composition) and a portion which is not compatible with said same second rubber.

In another embodiment, the present invention relates to a method of making a styrene butadiene rubber. The method comprises first charging styrene and butadiene into a reactor in a first molar ratio of styrene:butadiene in the presence of a monolithio initiator, a randomizer, and a solvent under polymerization conditions sufficient to obtain a first portion of styrene butadiene rubber with a monomer conversion in one embodiment of higher than about 80%, in another embodiment higher than about 88%, and in another embodiment higher than about 99%. Next, styrene, butadiene, or a mixture thereof is charged into the reactor in a second molar ratio in the presence of said first portion of styrene butadiene rubber, randomizer, and solvent under polymerization conditions sufficient to obtain a second portion of styrene butadiene rubber by polymerization to a final monomer conversion of higher than about 95%, in another embodiment higher than about 98%, and in another embodiment higher than about 99% based on the total charged monomer. The first and second molar ratios are selected so as to produce styrene butadiene rubber characterized by one or more of the following: a) two or more portions in one polymer chain which are incompatible with each other; or (b) two or more glass transition temperatures that vary by at least about 6° C.; or (c) two or more δ (SBR) values which differ by at least more than about 0.65 $(J/cm^3)^{0.5}$; or (d) two or more portions which vary in styrene content by at least about 20 weight percent based on the total weight of the rubber. The styrene butadiene rubber comprises at least a portion which is compatible with a second rubber (e.g., a rubber used in a tire tread composition) and a portion which is not compatible with said same second rubber.

DETAILED DESCRIPTION OF THE INVENTION

Figure 1:
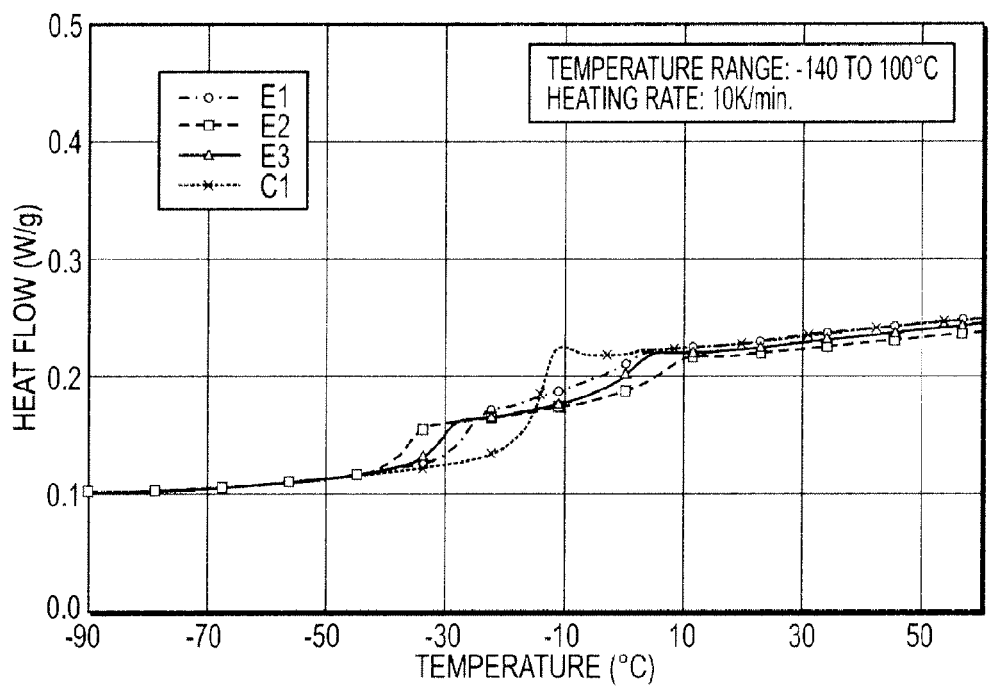
FIG. 1 shows the glass transition behavior of the styrene butadiene rubber of polymer comparison 1 (C1) and polymer examples 1-3 (E1-E3).

"Polymer" means a polymeric compound prepared by polymerizing monomers, whether of the same or a different type. The generic term "polymer" embraces the terms "homopolymer," "copolymer," "terpolymer" as well as polymers made by polymerizing four or more types of monomers.

"Composition," as used herein, includes a mixture of materials which comprise the composition, as well as reaction products, vulcanized products, and decomposition products formed or derived from the ingredients or materials of the composition.

"Portion," as used in the phrase "portions in one polymer chain" means a part or a segment of a single polymer chain. Different portions may be compatible or incompatible.

"Vinyl content," as used herein means the mass percentage of vinyl groups in the butadiene part of the styrene butadiene polymer.

"Molar ratio of styrene:butadiene" as used herein means the ratio of the moles of styrene used for polymerization of the portion divided by the sum of the moles of styrene and butadiene used for polymerization of the specified portion. For example, in Example 1 below 248.78 g (2.39 moles) of styrene is charged with 247 g (4.558 moles) of butadiene in the polymerization of the first portion. This results in a molar ratio of styrene:butadiene of 0.3438 [2.39 mol/(2.39 mol+4.558 mol)]. Similarly, to polymerize the second portion of the polymer in Example 1, 48.5 g (0.466 moles) of styrene is charged with 446 g (8.247 moles) of butadiene. This results in a molar ratio of styrene:butadiene of 0.0534 for the second portion. The difference between the molar ratios of the both portions is therefore 0.2904 (0.3438−0.0534).

Styrene Butadiene Rubber Compositions

In one aspect the present invention pertains to a composition comprising a solution styrene butadiene rubber (SSBR). The rubber is unique in that by one or more of the following before any vulcanization: (a) two or more portions in one polymer chain which are incompatible with each other; or (b) two or more glass transition temperatures that vary by at least about 6° C.; or (c) two or more δ (SBR) values which differ by at least more than about 0.65 $(J/cm^3)^{0.5}$; or (d) two or more portions which vary in styrene content by at least about 20 weight percent. In regard to (b), in the event that there are three or more glass transition temperatures, then the two that differ the most should differ by at least about 6° C. without regard to the third or additional glass transition temperature(s). Similarly, in regard to (c) in the event that there are three or more δ (SBR) values, then the two that differ the most should differ by at least more than about 0.65 $(J/cm^3)^{0.5}$ without regard to the third or additional δ (SBR) value(s). And in regard to (d) in the event that there are three or more portions which vary in styrene content, then the two that differ the most should differ by at least about 20 weight percent without regard to the third or additional portion(s). In one embodiment, the rubber has one of features (a)-(d). In another embodiment, the rubber has two of features (a)-(d). In another embodiment, the rubber has three of features (a)-(d). In another embodiment, the rubber has four of features (a)-(d). The styrene butadiene rubber is also unique in that it comprises at least a portion which is compatible with a second rubber (e.g., a rubber used in a tire tread composition) and a portion which is not compatible with said same second rubber.

The characteristics of the styrene butadiene rubber above are before any vulcanization. The styrene butadiene rubber of the invention may or may not be vulcanized depending upon the desired use. In the event that it is desired to vulcanize the styrene butadiene rubber such vulcanization may affect the characteristics. The extent to which the characteristics may be affected depends in part upon the specific composition and its properties, as well as, the nature and type of vulcanization.

By "incompatible" or "not compatible" it is meant that two or more portions or components are immiscible. On the other hand, by compatible it is meant that two or more portions or components are miscible. In regard to the other aforementioned characteristics, the methods of measuring are used by those skilled in the art and/or are described in detail in the examples below. The miscibility of polymers is often judged by investigation of the glass transition as described, for example, by S. Krause in *Pure & Applied Chem*. Vol 58, No 12, pp 1553-1560. Miscible polymers should have only a single glass transition temperature as measured by, for example, dilatometry, dynamic mechanical methods, dielectric methods, refractive index versus temperature, differential scanning calorimetry (DSC), differential thermal analysis, or radioscanning calorimetry.

For purposes of the present invention, DSC is employed to characterize the immiscibility or miscibility of the portions of the raw SSBR with respect to each other while Tan delta measurements on vulcanized compounds are used to determine whether the styrene butadiene rubber comprises at least a portion which is not compatible with said same second rubber. For the DSC method, the appearance of more than one glass transition temperature shows that there are immiscible portions in the SSBR composition. The appearance of only one glass transition temperature was used as proof of the compatibility, i.e., miscibility, of portions of the polymer chain.

Tan delta measurements on vulcanized compounds in dependency of the temperature as described in the Test Methods below are used to characterize whether styrene butadiene rubber comprises at least a portion which is not compatible with said same second rubber. The appearance of at least 2 maxima shows that there is at least a portion of the SSBR which is not compatible with said same second rubber. If desired, a solubility parameter δ (SBR) in $(J/cm^3)^{0.5}$ can be calculated from the composition according to Schuster et al. Rubber Chem. Technology 69 (1996). p 769 for each portion of the SSBR. This parameter may be useful in assessing the miscibility of portions of the SSBR with other rubbers, e.g., a second and/or a third rubber, that may be used in the composition. It may be desirable that upon vulcanization the vulcanized composition is characterized by at least two maxima in the tan delta course with the temperature.

In other words, it is desired that one portion of the inventive SSBR be compatible with the second rubber in the vulcanized composition while another portion of the inventive SSBR is incompatible with the second rubber in the vulcanized composition. The aforementioned solubility parameter is the desired method to assess the compatibility of the second rubber with each portion of the inventive SSBR. The absolute value of the difference of the solubility parameter between one portion of the inventive SSBR and the solubility parameter of the second rubber should be lower than 0.65, i.e., the second rubber is miscible with this specific portion of the SSBR. The absolute value of the difference of the solubility parameter of the other portion of the inventive SSBR and the solubility parameter of the second rubber should be higher than 0.65, i.e., the second portion is immiscible with the second rubber.

As an example, if one assumes the following: d (SBR, portion 1)=16.5 $(J/cm^3)^{0.5}$, d (SBR, portion 2)=17.8 $(J/cm3)^{0.5}$ and d (cis BR)=16.97 $(J/cm^3)^{0.5}$. Then, in order to assess the compatibility of the first portion of inventive SSBR with second rubber eg. cis BR one takes the absolute value of [d(SBR, portion 1)–d(cis BR)]=ABS[16.5–16.97]=0.47 which indicates that portion 1 is compatible. Similarly, in order to assess the compatibility of the second portion of inventive SSBR with second rubber eg. cis BR one takes the absolute value of [d(SBR, portion 2)–d(cis BR)]=ABS[17.8–16.97]=0.83 which indicates that portion 2 is incompatible.

As previously described, in some embodiments the SSBR may be characterized by having two or more glass transition temperatures that vary by at least about 6° C. In some embodiments the two or more glass transition temperatures may vary by preferably at least 8° C., or by more preferably at least 9° C. The glass transition temperature, Tg, is measured and calculated as described below in Test Methods.

In some embodiments the SSBR may be characterized by having two or more δ (SBR) values which differ by at least about 0.65 $(J/cm^3)^{0.5}$; in another embodiment by at least about 0.70 $(J/cm^3)^{0.5}$; and in another embodiment by at least about 0.75 $(J/cm^3)^{0.5}$. Similarly, in some embodiments the SSBR may be characterized by having two or more portions which vary in styrene content by at least about 20, or in another embodiment by at least about 25 weight percent. In some embodiments the styrene butadiene rubber comprises a portion in the polymer chain which comprises a styrene content of from about 0 to about 27 weight percent and a second portion in the polymer chain which comprises a styrene content of from about 21 to about 70 weight percent. Similarly, in some embodiments the styrene butadiene rubber comprises a first portion in the polymer chain which is incompatible with a second portion in the polymer chain wherein the weight ratio of said first portion to said second portion is from about 90:10 to about 10:90.

The SSBR may have one or more other rubbers and/or additives in admixture with the SSBR depending on the desired application. Useful other rubbers include, for example, those selected from the group consisting of natural rubber, cis-polybutadiene, emulsion polymerized styrene-butadiene rubber, high vinyl polybutadiene, and mixtures thereof. Particularly preferable additives include, for example, fillers like carbon black, silica, and mixtures thereof.

The invention also provides an article comprising at least one component formed from an inventive composition.

In one embodiment such an article is a tire.

The Mooney viscosity (ML 1+4) of the SSBR varies depending on the amount of monomers and process employed to make the SSBR. In one embodiment, the styrene butadiene rubber is characterized by a ML 1+4 of at least about 20, preferably at least about 40, up to 120, preferably up to 100 at 100° C.

If desired for a given application, the SSBR may be coupled and/or chain end functionalized by any convenient method. Such methods include those described in, for example, the reference US20080287601. The amount of coupling may vary depending upon the desired properties and application of the SSBR. In many applications it is preferable to couple the SSBR in an amount of up to about 40% by weight based on the total weight. Similarly, chain end functionalization of one or more portions of the SSBR may be accomplished by any convenient method. It has been found to be particularly preferable for some applications to chain end functionalize one or more portions of the styrene butadiene rubber that comprise less styrene content than a portion of the styrene butadiene rubber that is not chain end functionalized. This may result in a more desirable tan delta in some instances as shown, for example, when comparing the tan delta of Example 2 vs. Example 3 below.

Any useful method may be employed to make the inventive SSBR. A particularly useful method comprises first charging styrene and butadiene into a reactor in a first molar ratio of styrene:butadiene in the presence of a monolithio initiator, a randomizer, and a solvent under polymerization conditions sufficient to obtain a first portion of styrene butadiene rubber with a monomer conversion of higher than about 80%, in another embodiment of higher than about 88%, and in another embodiment of higher than about 99% by weight based on the charged monomer of this step. The monomer need not be charged completely at once at the beginning. Instead, parts of the monomer can be added incrementally during the polymerization according to the different reaction rates to facilitate maintenance of the molar ratio in this first portion of the polymer chain at the desired level.

Next, styrene, butadiene, or a mixture thereof are charged into the reactor in a second molar ratio in the presence of the first portion of styrene butadiene rubber, randomizer, and solvent under polymerization conditions sufficient to obtain a second portion of styrene butadiene rubber by polymerization to a final monomer conversion of higher than about 95%, in another embodiment higher than about 98%, and in another embodiment higher than about 99% based on the total charged monomer. As in the previous step, the required amount of monomer need not be charged all at the same time. Instead, the monomer may be added incrementally during the polymerization according to the different reaction rates to facilitate maintenance of the molar ratio in this second portion of the polymer chain at the desired level. Advantageously, the first and second molar ratios are selected so as to produce styrene butadiene rubber characterized by one or more of the following: a) two or more portions in one polymer chain which are incompatible with each other; or (b) two or more glass transition temperatures that vary by at least about 6° C.; or (c) two or more δ (SBR) values which differ by at least more than about 0.65 $(J/cm^3)^{0.5}$; or (d) two or more portions which vary in styrene content by at least about 20 weight percent. The styrene butadiene rubber comprises at least a portion which is compatible with a second rubber and a portion which is not compatible with said same second rubber.

It has been found to be particularly useful to employ a difference between the first and second molar ratio of styrene:butadiene of from about 0.155 to about 0.5. Similarly, particularly useful randomizers may include, for example, tetramethylenediamine, tetrahydrofurane, ditetrahydrofurylpropane, ethyleneglycoldiethylether, ethyltetrahydrofurylether, tertiary butyl ethyl glyme, triethyleneglycol dimethyl ether and mixtures thereof. Useful coupling agents may include, for example, tintetrachloride, silicontetrachloride, siliconalkoxides and mixtures thereof. Useful chain end functionalization agents may include, for example, those selected from the group consisting of amines, amides, thioglycols, silicon alkoxides, silane-sulfide modifiers and mixtures thereof.

While certain representative embodiments and details have been shown for purposes of illustrating the present invention, various modifications and changes to the process can be made without departing from the scope of the present invention.

Test Methods

The following test methods may be applicable to the present invention and the examples below.

Size Exclusion Chromatography to Determine Molecular Weight Distribution

Molecular weight, molecular weight distribution and coupling rate (CR) of the polymer were each measured using Size Exclusion Chromatography (SEC), based on polystyrene standards. Each polymer sample (9-11 mg) was dissolved in 10 ml tetrahydrofuran to form a solution. The solution was filtered using a 0.45 µm filter. A 100 µl sample was fed into a GPC column (Hewlett Packard system 1100 with 3 PLgel 10 µm MIXED-B columns). Refraction Index—detection was used as the detector for analyzing the molecular weight. The molecular weight was calculated as polystyrene, based on the calibration with EasiCal PS1 (Easy A and B) Polystyrene standards from Polymer Laboratories. Depending on the resolution of the columns, 2, 3 or 4 peaks can be detected. The peak area with the largest area and longest retention time corresponds to the amount of uncoupled polymer. At high resolution, four peaks were obtained. The highest peak with the highest area and longest retention time represented the amount of uncoupled linear polymer. The molecular weight Mp (PS) means the molecular weight $M_{w,top}$ (Mw at highest intensity (mass amount)), the value of $M_w$, with the highest mass amount of molecules, of this linear uncoupled polymer, calculated as polystyrene. The smaller peaks with higher molecular weights represented the coupled polymer. The coupling rate is calculated as the mass fraction of the sum of the area of all coupled peaks, corresponding to the coupled polymer, based on the total area of all peaks including the uncoupled polymer.

Figure 6:
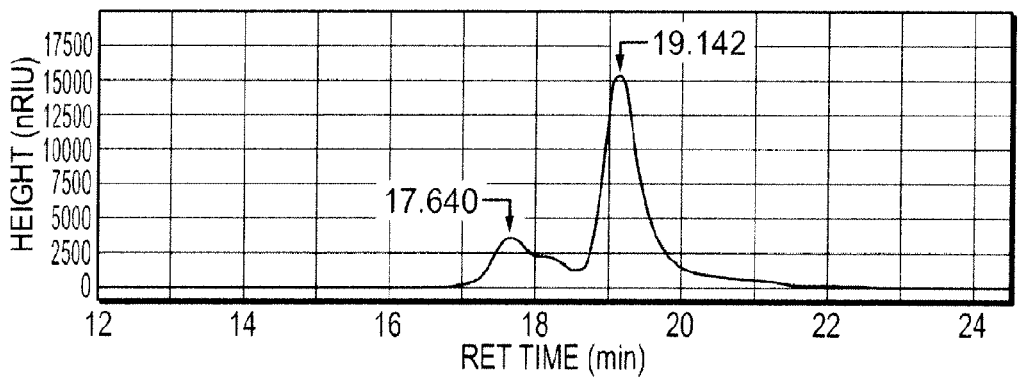
FIG. 6 is a size exclusion chromatagraph of Example 1.

As an example calculation, in the case of example 1 there were two different peaks observed as shown by the SEC of FIG. 6. The highest peak with an area of 6.29356E5 nRIU*s was observed at the retention time of 19.142 minutes and represents the entirety of the uncoupled polymer. The molecular weight Mp was determined to be 244412 g/mol based on the polystyrene standards. The second peak was observed at a retention time of 17.640 minutes and had an area of 1.84576E5 nRIU*s. This peak represents the entirety of the coupled polymer. The coupling rate for example 1 was calculated as peak area of coupled polymer divided by the total area to be 22.68% (CR=1.84576E5 nRIU*s/(1.84576E5 nRIU*s+6.29356E5 nRIU*s)*100%=22.68%). The calculation may be accomplished with, for example, software used for calculation of the molecular weights from the SEC results. In the instant case of example 1, the Cirrus GPC Sample Report (Area report) from Agilent Technologies Chem. Station for LC Rev. A.10.02[1757] was used.

Gravimetric Analysis to Measure Monomer Conversion

Monomer conversion was determined via measurement of the solids concentration of the polymer solution during the polymerization. The maximum solid content is obtained at 100 wt % conversion of all charged butadiene $\tau m_{iBd}$ and styrene $\Sigma m_{iSt}$ for the first portion by $TSC_{max,\ 1,portion} = (\Sigma m_{iBd,\ 1,portion} + \Sigma m_{iSt,\ 1,portion})/((\Sigma m_{iBd,\ 1,portion} + \Sigma m_{iSt,\ 1,portion} + m_{TMEDA} + m_{NBL} + m_{Cyclohexan}) *100\%$ respectively for the final polymer by $TSC_{max} = (\Sigma m_{iBd} + \Sigma m_{iSt})/((\Sigma m_{iBd} + \Sigma m_{iSt} + m_{TMEDA} + m_{NBL} + m_{Cyclohexan} + m_{coupling\ agent} + m_{modification\ agent}) *100\%$. A sample of polymer solution of about 1 g to 10 g, depending on the expected monomer conversion, was drawn from the reactor directly into a 200 ml Erlenmeyer flask filled with 50 ml ethanol. The weight of the filled Erlenmeyer flask was determined before as "A," and after sampling, as "B". The precipitated polymer was removed from the ethanol by filtration on a weighted paper filter (Micro-glass fiber paper, Ø 90 mm, MUNKTELL, weight C), dried at 140° C., using a until a moisture analyzer HR73 (Mettler-Toledo), until a constant mass was achieved. The criterion 5 was used. Finally, a second drying period was applied, using switch off criteria 4 to obtain the final mass "D" of the dry sample on the paper filter. The polymer content in the sample was calculated as "TSC=(D−C)/(B−A)*100%." The monomer conversion was finally calculated as "TSC/$TSC_{max,\ 1,Portion}$*100%" in case of the first portion and "TSC/$TSC_{max}$*100%" for the final monomer conversion.

Gravimetric Analysis to Measure Reduced Volatiles

A polymer sample of about 5 g was dried at 120° C., using a halogen moisture analyzer HR73 (Mettler-Toledo), until a value for the residual moisture was obtained which was below 0.5 wt %, based on total amount of polymer.

1H-NMR

Vinyl and styrene content was measured using 1H-NMR, following ISO 21561-2005, using a NMR spectrometer BRUKER Avance 200, and a 5 mm Dual probe. The $CDCl_3$/TMS was used as solvent in a weight ratio of 0.05%:99.95%.

DSC (Tg)

The glass transition temperature, Tg, was measured and calculated as described in ISO 11357-2 (1999) for $T_{mg}$, with the exception that a heat rate of 10 K/min was used. The following conditions were used:

Weight of sample: about 11 mg
Sample container: Standard aluminum pans
Temperature range: (−140 . . . 100)° C.
Heating rate: 10 K/min
Cooling rate: free cooling
Purge gas: 20 ml Ar/min
Cooling agent: liquid nitrogen
Evaluation method: half height
Device: DSC 2920 from TA-Instruments Mooney Viscosity ML1+4 (100° C.)

Mooney viscosity on polymer (no filler and no oil) was measured according to ASTM D 1646 (2004), with a preheating time of one minute, and a rotor operation time of four minutes, at a temperature of 100° C. [ML1+4(100° C.)] on a MV2000 E from Alpha-Technologies.

Rheological Properties

Measurement of rheological properties on unvulcanized compounded samples were made according to ASTM D 5289-07, using a rotor-less shear rheometer (MDR 2000 E) to measure Scorch Time (ts) and Time to Cure (tx). The "tx" is the respective time required to achieve x percent conversion of the vulcanization reaction as explained in ASTM D 5289-07. The sample specimen was prepared according to ASTM D5289-07. This measurement was done to determine the time t95 necessary for achieving 95% of the conversion of the vulcanization reaction. The determined t95 was used to decide the required vulcanization time for the preparation of the different specimen for the different tests as mentioned below for each test method.

Tensile Strength, Elongation at Break, and Modulus at 300% Elongation (Modulus 300) were each measured according to ASTM D 412-06, using dumbbell Die C on a Zwick Z010 tensile machine (punched out from a 2 mm thick plate after curing of the specimen to t95), 160° C., 160-220 bar, ambient atmosphere)

Heat Build Up (HBU)

HBU was measured according to ASTM D 623-07, method A, on a Doli 'Goodrich'-Flexometer (curing of the specimen for t95+5 min; dimensions: height: 25.4 mm, diameter 17.8 mm, 160° C., 160-220 bar, ambient atmosphere).

Tan δ

For the Tan δ measurements at different temperatures, the unvulcanized polymer formulation was pressed into disks of 60 mm inner-diameter and 8 mm height. Pressing (about 200 bar pressure) the rubber compound into above metal disk removes air, thus avoiding inclusion of air bubbles, and leads to the formation of visually bubble free, homogeneous compound material. After completion of the vulcanization process (160° C., for 20 minutes to achieve 95% vulcanization conversion (ambient atmosphere), a homogeneous disk of 60 mm diameter and 8 mm height results. A specimen is drilled out of the aforementioned dish, and has a size of 10 mm diameter and 8 mm height.

Tan δ was measured using the dynamic spectrometer, Eplexor 150N manufactured by Gabo Qualimeter Testanlagen GmbH (Germany), applying a compression dynamic strain of 0.2%, at a frequency of 2 Hz. The tan delta course with the temperature was measured in a temperature range between −70 and +70° C. in case of NR as second rubber in the compound and in a temperature range between −120 and +70° C. in case of cis-BR as second rubber in the compound, starting at the lowest temperature and increasing the temperature by 1K/min.

Tan δ (60° C. or 70° C.).

Tan δ (60° C.) respectively 70° C. was used as lab predictor to assess the rolling resistance behaviour. The smaller the index, the lower is the rolling resistance (lower=better).

Tan δ (20° C.)

Tan δ (20° C.) was measured using the same equipment and load conditions at 20° C. Tan δ (20° C.) was used as lab predictor for the grip performance. The larger the index, the better the grip resistance (higher=better).

DIN Abrasion

DIN abrasion was measured according to ASTM D 5963-04. The larger the index, the lower the wear resistance is (lower DIN abrasion values=better). The specimen was prepared as described for tan δ.

Tear Strength

Tear strength is measured according to ASTM D624-00, using Die C which is punched out from a 2 mm plate after curing to t95.

EXAMPLES

The practice of this invention is further illustrated by reference to the following examples and comparisons which are intended to be representative rather than restrictive of the scope of this invention. The examples provided are intended to assist in an understanding of the invention, and are directed to those of skill in the art. Particular species employed, particular conditions, relationships, and the like, are designed to be illustrative, and not limiting. All designations of "part" or "parts" and "%" as will be used in the following examples mean part or parts by weight and wt. % unless expressly noted.

The ingredients and conditions for all comparisons and examples were as follows unless stated otherwise: Cyclohexane (distilled) was used as a solvent. The 1,3-butadiene (distilled) and styrene (dried via $CaH_2$) were used as monomers. Tetramethylethylenediamine (TMEDA (Merck)) was diluted in cyclohexane, and used as a as randomizer, and as a vinyl promoter. Tin tetrachloride (Fluka) was also diluted in cyclohexane, and used as a coupling agent. Methanol (Merck) was used as a termination agent. The 2,6-di-tert-butyl-4-methylphenol (B.H.T) was from Sunvit GmbH. The polymerizations were performed under exclusion of moisture and oxygen in a nitrogen atmosphere.

Polymer Comparison 1

4510.8 g Cyclohexane, 385.3 g Butadiene, 171.85 g styrene and 14.8219 mmol TMEDA were charged to an airfree 10 liter reactor and the stirred mixture was heated up to 35° C. Then n-Butyllithium was charged dropwise to react the impurities until the color of the reaction mixture changed to yellowish (Titration Step). After that the recipe amount of 4.34 mmol n-butyllithium corresponding to the target molecular weight of the polymer was charged immediately via pump to start the polymerization. The start time of the charge of the main amount of n-butyllithium was used as the start time of the polymerization. In parallel the temperature was increased by heating or cooling via hot water in the wall of the reactors beginning with the charge of the main amount of n-butyllithium to the final polymerization temperature $T_{pm}$ of 55° C. with a rate of 0.33° C./min to accelerate the polymerization reaction and shorten the reaction time. After 15 minutes a small sample was taken to determine the conversion and confirm the composition. The conversion was found to be 28.65 wt % and the polymer consists of 28.3 wt % styrene and 65.8 wt % vinyl in the butadiene part.

After that a monomer mixture consisting of 278.98 g butadiene and 12.61 g styrene was charged with a constant feeding rate over a time of 60 minutes. A small sample was taken and the monomer conversion determined to 90.31 wt %. The composition of this polymer sample was analysed to 29.9 wt % styrene and 63 wt % vinyl in the remaining butadiene part. The reaction was allowed to complete for another 40 minutes. After that 6.07 g butadiene was charged within one minute and allowed to react for 12 minutes. Finally, a second butadiene charge of 22.39 g butadiene was done within one minute, followed by a reaction time of 15 minutes. The reaction time of the first butadiene addition step was used to charge 0.3549 mmol tintetrachloride for a coupling of 25% of the chains. The reaction time of the fifth addition step was used to charge 5.0064 mmol n-methylpyrrolidone for functionalization of the final chain ends. The polymer solution was cooled down to ambient temperature. The methanol was added in a ratio of methanol/active initiator of 2 mol/mol under stirring to terminate the reaction. After that the antioxidant was distributed as solution in cyclohexane into the polymer cement. The polymer was then recovered from the solution via steam stripping at 100° C. Then the polymer was milled to small crumbs, dried in an oven with air circulation at 70° C. for 30 minutes. Finally, the polymer crumbs were dried under ambient conditions in air until a content of residual volatiles of below 0.5% by weight was reached.

The composition of the final polymer was determined to 30.9 wt % styrene and 62.2 wt % vinyl in the butadiene part. The three analyses showed an even distribution of the styrene in the polymer chain with only about a 3% difference between the styrene content in the first portion and the styrene content in the remaining portion as it is calculated in table 1.

Polymer Example 1

Cyclohexane ($m_{Cyclohexan}$=4504.2 g), Butadiene ($m_{1,Bd}$=122.9 g), styrene ($m_{1,St}$=248.78 g) and 14.8219 mmol TMEDA ($m_{TMEDA}$=73.38 g of the solution in cyclohexane) were charged to an airfree 10 liter reactor and the stirred mixture was heated up to 35° C. Then n-Butyllithium was charged dropwise to react the impurities until the color of the reaction mixture changed to yellowish (Titration Step, n-butyllithium solution in cyclohexane $m_{NBL,\ titration}$=5.91 g). After that the recipe amount of 6.23 mmol n-butyllithium (as solution in cyclohexane $m_{NBL,\ Recipe}$=15.82 g) corresponding to the target molecular weight of the polymer was charged immediately via pump to start the polymerization. The start time of the charge of the main amount of n-butyllithium was used as the start time of the polymerization. In parallel the temperature was increased by heating or cooling via hot water in the wall of the reactors beginning with the charge of the main amount of n-butyllithium to the final polymerization temperature $T_{pm}$ of 55° C. with a rate of 0.67 C/min to accelerate the polymerization reaction and shorten the reaction time. After 5 minutes butadiene ($m_{2,Bd}$=79.09 g) was charged with a constant feeding rate over a time of 30 minutes, followed by a charge of 44.57 g butadiene ($m_{3,Bd}$=44.57 g) in 30 minutes to polymerize the first (high styrene) part of the polymer chain. A small sample was taken to determine the conversion and for confirmation of the structure of the first portion of the rubber molecule.

For polymerization of the second portion (low styrene part) 439.04 g butadiene ($m_{4,Bd}$=439.04 g) and styrene ($m_{2,St}$=48.5 g) were charged together with a constant feed rate within 30 minutes into the reactor. The reaction was allowed to complete for further 45 minutes. After that butadiene ($m_{5,Bd}$=7.08 g) was charged within one minute with a following reaction time of 28 minutes. The reaction time of the butadiene addition step was used to charge 0.3564 mmol tintetrachloride (as solution in cyclohexane $M_{Coupling\ agent}$ 53.62 g) for coupling of 25% of the chains. Ten minutes later 5.0064 mmol n-methylpyrrolidone (as solution in cyclohexane: $m_{modification\ agent}$ 51.26 g) was charged for functionalization of the final chain ends. A small sample was taken to determine the conversion and the composition. The polymer solution was cooled down to ambient temperature. The methanol was added in a ratio of Methanol/active initiator of 2 mol/mol under stirring to terminate the reaction. After that the antioxidant was distributed as solution in cyclohexane into the polymer cement. The polymer was then recovered from the solution via steam stripping at 100° C. Then the polymer was milled to small crumbs, dried in an oven with air circulation at 70° C. for 30 minutes. Finally, the polymer crumbs were dried under ambient conditions on air until a content of residual volatiles of below 0.5% by weight was reached.

Polymer Comparison 2

Example 1 was repeated with the following changes: 4505.2 g cyclohexane, 1170.54 g butadiene, 200.63 g styrene and 14.8219 mmol TMEDA were charged in the empty and airfree reactor.

The reaction was started with 4.96 mmol Butyllithium. After 5 minutes reaction time 118.58 g butadiene were charged with a constant feeding rate for 30 minutes to complete the first portion (high styrene part) of the polymer chain. A small sample was taken for determination of the conversion and confirmation of the structure of the first portion of the rubber molecule.

For polymerization of the second portion (low styrene part) 303.48 g butadiene and 86.94 g styrene were charged together with a constant feed rate within 15 minutes into the reactor, directly followed by the charge of 92.46 g butadiene together with 9.77 g styrene within 30 minutes. The reaction was allowed to complete for further 20 minutes. After that 7.18 g butadiene was charged within one minute with a following reaction time of 28 minutes. The reaction time of the butadiene addition step was used to charge 0.358 mmol tintetrachloride for coupling of 25% of the chains. Ten minutes later 5.1679 mmol n-methylpyrrolidone was charged for functionalization of the final chain ends.

Polymer Example 2

4526.8 g cyclohexane, 75.5 g butadiene, 298.82 g styrene and 14.8219 mmol TMEDA were charged to an airfree 10 liter reactor and the stirred mixture was heated up to 35° C. Then n-Butyllithium was charged dropwise to react the impurities until the color of the reaction mixture changed to yellowish (Titration Step). After that the recipe amount of 6.55 mmol n-butyllithium corresponding to the target molecular weight of the polymer was charged immediately via a pump to start the polymerization. The start time of the charge of the main amount of n-butyllithium was used as the start time of the polymerization. In parallel the temperature was increased by heating or cooling via hot water in the wall of the reactors beginning with the charge of the main amount of n-butyllithium to the final polymerization temperature $T_{pm}$ of 55° C. with a rate of 0.67° C./min to accelerate the polymerization reaction and shorten the reaction time. After 5 minutes the first charge step of 79.49 g butadiene started using a constant feed rate for a charge time of 30 minutes. No reaction time was allowed afterwards. The second addition step of 44.77 g butadiene started immediately using a constant feedrate for 30 minutes to complete the first part (high styrene part) of the rubber chain. A small sample was taken for determination of the conversion and confirmation of the structure.

The third addition step started immediately charging 489.99 g butadiene with a constant feeding rate for 30 minutes. The reaction was allowed to proceed after finishing the butadiene charge for 40 minutes. The reaction time of the third addition step was used to charge 0.3582 mmol tintetrachloride after 30 minutes for coupling of about 25% of the chains. After that the last addition of 7.18 g butadiene was done within one minute, followed by a reaction time of 15 minutes. The reaction time of the last addition step was used to charge 5.0078 mmol n-methylpyrrolidone for functionalization of the final chain ends. The polymer solution was cooled down to ambient temperature. The methanol was added in a ratio of Methanol/active initiator of 2 mol/mol under stirring to terminate the reaction. After that 8.14 g Jonol were distributed as solution in cyclohexane into the polymer cement. The polymer was then recovered from the solution via steam stripping at 100° C. The polymer was milled to small crumbs, dried in an oven with air circulation at 70° C. for 30 min. Finally, the polymer crumbs were dried under ambient conditions on air until a content of residual volatiles of below 0.5% by weight was reached. A small sample was taken to determine the conversion and for confirmation of the structure of the first portion of the rubber molecule.

Polymer Example 3

4540.8 g cyclohexane, 481.8 g butadiene, and 7.9659 mmol TMEDA were charged to an airfree 10 liter reactor and the stirred mixture was heated up to 35° C. Then n-Butyllithium was charged dropwise to react the impurities until the color of the reaction mixture changed to yellowish (Titration Step). After that the recipe amount of 5.29 mmol n-butyllithium corresponding to the target molecular weight of the polymer was charged immediately via a pump to start the polymerization. The start time of the charge of the main amount of n-butyllithium was used as the start time of the polymerization. In parallel the temperature was increased by heating or cooling via water in the wall of the reactors beginning with the charge of the main amount of n-butyllithium to the final polymerization temperature $T_{pm}$ of 55° C. with a rate of 0.67 C/min to accelerate the polymerization reaction and shorten the reaction time. The reaction was allowed to complete within 40 minutes to polymerize the first portion (low styrene part) of the polymer chain. A sample was taken for determination of the conversion and to confirm the composition.

The second portion of the polymer chain was polymerized as follows: 74.48 g butadiene and 297.71 g styrene were charged together in the same reactor without removing the first portion using a constant feed rate for a charge time of 10 minutes, followed by the charge of 79.19 g butadiene within 20 minutes, and an additional 44.49 g butadiene within the following 30 minutes. A further reaction time of 10 minutes followed.

6.98 g butadiene was then charged within one minute and allowed to react for a further 10 minutes. The reaction time of this step was used to charge 0.4021 mmol tintetrachloride for coupling of about 25% of the chains. 7.08 g butadiene was then charged within one minute, followed by a reaction time of 15 minutes. The reaction time of the last addition step was used to charge 5.513 mmol n-methylpyrrolidon for functionalization of the final chain ends. A small sample was taken to determine the conversion and for confirmation of the structure. The polymer solution was then cooled down to ambient temperature. The methanol was added in a ratio of Methanol/active initiator of 2 mol/mol under stirring to terminate the reaction. After that 8.14 g Jonol were distributed as solution in cyclohexane into the polymer cement. The polymer was then recovered from the solution via steam stripping at 100° C. The polymer was milled to small crumbs, dried in an oven with air circulation at 70° C. for 30 min. Finally, the polymer crumbs were dried under ambient conditions on air until a content of residual volatiles of below 0.5% by weight was reached.

Polymer Example 4

4525.7 g Cyclohexane, 295.15 g Butadiene, 80.96 g styrene and 13.693 mmol TMEDA were charged to an airfree 10 liter reactor and the stirred mixture was heated up to 35° C. Then n-Butyllithium was charged dropwise to react the impurities until the color of the reaction mixture changed to yellowish (Titration Step). After that the recipe amount of 4.67 mmol n-butyllithium corresponding to the target molecular weight of the polymer was charged immediately via pump to start the polymerization. The start time of the charge of the main amount of n-butyllithium was used as the start time of the polymerization. In parallel the temperature was increased by heating or cooling via hot water in the wall of the reactors beginning with the charge of the main amount of n-butyllithium to the final polymerization temperature $T_{pm}$ of 55° C. with a rate of 0.67° C./min to accelerate the polymerization reaction and shorten the reaction time. After 15 minutes 94.45 g butadiene and 9.98 g styrene were charged with a constant feeding rate over a time of 30 minutes. The reaction was allowed to complete for a further 20 minutes to polymerize the first (low styrene) portion of the polymer chain. A small sample was taken for determination of the conversion and confirmation of the structure of the first portion of the rubber molecule.

For polymerization of the second portion (high styrene part) 185.47 g butadiene and 191.51 g styrene were charged together with a constant feed rate within 15 minutes into the reactor followed by the addition of 103.72 g butadiene and 15.5 g styrene with a constant feed rate within 25 minutes. The reaction was allowed to complete for a further 20 minutes. After that 7.08 g butadiene was charged within one minute with a following reaction time of 28 minutes.

The reaction time of the butadiene addition step was used to charge 0.3555 mmol tintetrachloride for coupling of 25% of the chains. Ten minutes later 4.542 mmoles n-methylpyrrolidon were charged for functionalization of the final chain ends. A small sample was taken to determine the conversion and for confirmation of the structure. The polymer solution was cooled down to ambient temperature. The methanol was added in a ratio of Methanol/active initiator of 2 mol/mol under stirring to terminate the reaction. After that the antioxidant was distributed as solution in cyclohexane into the polymer cement. The polymer was then recovered from the solution via steam stripping at 100° C. Then the polymer was milled to small crumbs, dried in an oven with air circulation at 70° C. for 30 min. Finally, the polymer crumbs were dried under ambient conditions on air until a content of residual volatiles of below 0.5% by weight was reached.

Representative Calculations for Example 1

A sample of polymer solution was drawn from the reactor, directly after finishing the polymerization of the first portion as described previously. The solid content of the polymer solution was determined as described in the above test methods to be 9.7217%. The currently charged monomer for preparation of the first portion amount to 495.34 g ($\Sigma m_{monomer,\ 1,portion}=m_{1,Bd}+m_{2,Bd}+m_{3,Bd}+m_{1,\ St}$, $m_{1,Bd}$: 122.9 g, $m_{1,\ St}$ 248.78 g, $m_{2,Bd}$ 79.09 g, $m_{3,Bd}$ 44.57 g) and the current charged total chemicals amount to 5094.64 g (($\Sigma m_{i,\ monomer,\ 1,portion}$ 495.34 g monomer, $m_{Cyclohexan}$ 4504.2 g, $m_{TMEDA}$ 73.38 g, $m_{NBL}$ 21.73 g). This results in a maximum achievable TSC for the first portion of 9.723% ($TSC_{max,\ 1,portion}$=495.34 g/5094.64 g*100%). The monomer conversion for the first portion was determined to be $c_{current}$=TSC/TSC max*100% to 99.99 wt %, resulting in 495.29 g of new formed polymer as a first portion of the polymer chain. The composition of the polymer was investigated by 1H-NMR, and found to comprise 46.8 wt % styrene and 53.7% vinyl units in the butadiene part. Therefore 231.8 g styrene and 263.5 g butadiene were incorporated in the first portion of the polymer chain and 53.7% of the 263.5 g incorporated butadiene corresponds to 141.5 g incorporation as vinyl.

The next sample of polymer solution was drawn at the end of the reaction as described before. The solid content of the polymer solution was determined as described in the test methods above to be 17.371%. The totally monomer charged for preparation of the total polymer amounted to 989.96 g ($\Sigma m_{monomer}=\Sigma m_{monomer,\ 1,portion}+m_{4,Bd}+m_{5,Bd}+m_{2,St}$, where $m_{4,Bd}$: 439.4 g, $m_{2,St}$: 48.5 g, $m_{5,Bd}$ 7.08 g) and the finally charged total chemicals amounted to 5694.7 g (($\Sigma m_{monomer}$: 989.96 g, $m_{Cyclohexan}$ 4504.2 g, $m_{TMEDA}$ 73.38 g, $m_{NBL}$ 21.73 g, $m_{Coupling\ agent}$ 53.62 g, $m_{modification\ agent}$ 51.26 g), which results in a maximum achievable at the end of the reaction of 17.3839% ($TSC_{max}$=989.96 g/5694.7 g*100%). The monomer conversion was determined to be $c_{final}$=TSC/TSC max*100% to 99.929 wt %, resulting in 989.17 g totally formed polymer. The composition of the polymer was investigated by 1H-NMR, and found to consist of 28.5 wt % styrene and 63.9 wt % vinyl units in the butadiene part. So, 281.9 g styrene and 707.3 g butadiene were incorporated in the total polymerchain. 63.9 wt % of the 707.3 g incorporated butadiene correspond to 451.9 g incorporation as vinyl. The composition of the second portion of the polymer chain can be calculated from the differences in the composition between the final polymer and the first portion. The polymer formed as a second portion is 493.88 g, i.e., the difference between the 989.17 g final polymer and the 495.29 g polymer formed in the first portion.

The styrene incorporated in the second portion is 50.12 g which results from the difference of the total incorporated styrene of 281.91 g and the 231.8 g styrene which were incorporated in the first portion. Therefore, the styrene content in the second portion in weight % is given as $c_{2,portion,\ styrene}$=231.8 g/989.17 g*100%=10.15%. The difference between the 50.12 g of styrene and the 493.88 g of total formed polymer in the second portion is the 443.76 g butadiene, which was incorporated in the second portion.

The vinyl incorporated in the second portion is 310.44 g which results from the difference of the total incorporated vinyl of 451.94 g and the 141.5 g which was incorporated in the first portion. The vinyl content in the second portion in weight % is given as $c_{2,portion,\ vinyl}$=310.44 g/443.76 g*100=69.96%.

Measured and Calculated Data for Polymer Examples 1-4 and Polymer Comparisons 1-2

Tables 1a and 1b below contain the measured and calculated data for the polymer examples 1-3 and polymer comparisons 1-2 above. Tables 2a and 2b below contain the measured and calculated data for the polymer examples 4 and polymer comparisons 1 and 2 above. The compatibility of the different structures was assessed by comparing the differences of the solubility parameters in combination with the assessement of the glass transition behavior of the rubber. The solubility parameter δ (SBR) in $(J/cm^3)^{0.5}$ of the chain and the parts of the chain were calculated as described by Schuster et al. in *Rubber Chem. Technol.*, Vol. 69, pp. 769 (1996) from the measured or calculated styrene and vinyl content of the chain and each part of the chain. The results of the calculations are provided in Table 1.

All examples and comparisons were prepared to contain an average about 30% styrene and 70% butadiene and a vinyl content of about 62% in the butadiene portion of the final polymer for better comparison. The percentages were determined via 1H-NMR as described previously.

TABLE 1A

| Example | | | | E1 | E2 | E3 | C1 | C2 |
|---|---|---|---|---|---|---|---|---|
| Portion 1 | | | | | | | | |
| | | Monomer charged | g | 495.34 | 502.51 | 481.80 | 557.15 | 489.74 |
| | | Total Charge | g | 5094.64 | 5128.76 | 5063.13 | 5158.92 | 5085.81 |
| | | TSC $_{measured}$ | % | 9.722 | 9.6338 | 8.0636 | 3.0939 | 8.4806 |
| | | TSC $_{max,\ Portion\ 1}$ | % | 9.723 | 9.798 | 9.516 | 10.800 | 9.630 |
| calc | | Conversion | % | 99.99 | 98.33 | 84.74 | 28.65 | 88.07 |
| calc | | Polymer | g | 495.3 | 494.1 | 408.3 | 159.6 | 431.3 |
| 1H-NMR | | Styrene | % | 46.8 | 60.4 | 0 | 28.3 | 38.5 |
| 1H-NMR | | Vinyl | % | 53.7 | 38 | 73.7 | 65.8 | 57.9 |
| calc | | Styrene | g | 231.80 | 298.4 | 0.0 | 45.2 | 166.1 |
| calc | | Butadiene | g | 263.49 | 195.7 | 408.3 | 114.4 | 265.3 |
| calc | | Vinyl | g | 141.50 | 74.4 | 300.9 | 75.3 | 153.6 |
| calc | | $δ_{(SBR,\ Portion\ 1)}$ | $(J/cm^3)^{0.5}$ | 18.26 | 18.7 | 16.7 | 17.6 | 18.0 |
| Final Polymer | | | | | | | | |
| | | Monomer charged | g | 989.96 | 1004.15 | 991.72 | 990.20 | 989.57 |
| | | Total Charge | g | 5694.70 | 5684.10 | 5694.12 | 5697.38 | 5691.1 |
| | | TSC $_{measured}$ | % | 17.371 | 17.67 | 17.09 | 17.47 | 17.24 |
| | | TSC $_{max,\ Final\ polymer}$ | % | 17.384 | 17.666 | 17.417 | 17.380 | 17.388 |
| calc | | Conversion | % | 99.9 | 100.0 | 98.1 | 100.5 | 99.1 |
| calc | | Polymer | g | 989.17 | 1004 | 973 | 995 | 981 |
| 1H-NMR | | Styrene | % | 28.5 | 30.6 | 30.1 | 30.9 | 29.8 |
| 1H-NMR | | Vinyl | % | 63.9 | 60.2 | 62.2 | 62.2 | 62.1 |
| calc | | Styrene | g | 281.91 | 307.3 | 292.9 | 307.6 | 292.4 |
| calc | | Butadiene | g | 707.26 | 697.0 | 680.2 | 687.8 | 688.8 |
| calc | | Vinyl | g | 451.94 | 419.6 | 423.1 | 427.8 | 427.7 |
| Portion 2 | | | | | | | | |
| calc | | Polymer | g | 493.88 | 510.3 | 564.8 | 835.7 | 549.8 |
| calc | | Styrene | g | 50.12 | 8.9 | 292.9 | 262.4 | 126.3 |
| calc | | Butadiene | g | 443.76 | 501.4 | 271.9 | 573.3 | 423.5 |
| calc | | Vinyl | g | 310.44 | 345.3 | 122.2 | 352.5 | 274.1 |
| calc | | Styrene | % | 10.15 | 1.75 | 51.86 | 31.40 | 22.98 |
| calc | | Vinyl | % | 69.96 | 68.86 | 44.93 | 61.48 | 64.73 |
| calc | | $δ_{(SBR,\ Portion\ 2)}$ | $(J/cm^3)^{0.5}$ | 17.0 | 16.8 | 18.4 | 17.8 | 17.5 |
| Compatibility of the 2 portions in the SSBR chain | | | | | | | | |
| calc | | I$δ_{(SBR,\ Portion\ 1)}$−$δ_{(SBR,\ Portion\ 2)}$I | $(J/cm^3)^{0.5}$ | 1.23 | 1.95 | 1.76 | 0.12 | 0.52 |
| Are both portions of the SSBR chain compatible? | | | | no | no | no | YES | YES |
| Diff Styrene content I(Portion 1-Portion 2)I | | | % | 36.7 | 58.7 | 51.9 | 3.1 | 15.5 |
| Compatibility with NR | | | | | | | | |
| | | $δ_{(NR)}$ | $(J/cm^3)^{0.5}$ | 16.56 | 16.56 | 16.56 | 16.56 | 16.56 |
| calc | | I$δ_{(SBR,\ Portion\ 1)}$−$δ_{(NR)}$I | $(J/cm^3)^{0.5}$ | 1.70 | 2.16 | 0.12 | 1.07 | 1.42 |
| Is portion 1 of the SSBR chain with NR compatible? | | | | no | no | YES | no | no |
| calc | | I$δ_{(SBR,\ Portion\ 2)}$−$δ_{(NR)}$I | $(J/cm^3)^{0.5}$ | 0.47 | 0.21 | 1.88 | 1.19 | 0.91 |
| Is portion 2 of the SSBR chain with NR compatible? | | | | YES | YES | no | no | no |

TABLE 1B

| Example | | | E1 | E2 | E3 | C1 | C2 |
|---|---|---|---|---|---|---|---|
| Polymer Chain Structure | | | | | | even styrene along polymer chain | compatible blocks |
| Styrene in Portion 1 -Styrene in Portion 2-Functionalization | | | 50-10-F | 60-0-F | 0-60-F | 30-F | 40-20-F |
| Portion 1 | Styrene content in % | | 50 | 60 | 0 | 30 | 40 |
| Portion 2 | Styrene content in % | | 10 | 0 | 60 | 30 | 20 |
| Coupling | | | yes | yes | yes | yes | yes |
| Chain end functionalization yes/no | | | yes | yes | yes | yes | yes |
| Weight Ratio Part 1:Part 2 | | | 50:50 | 50:50 | 50:50 | 100 | 50:50 |
| Results Final Polymer | | | | | | | |
| — | ML1 + 4 | MU | 65.4 | 72.9 | 70.4 | 69.3 | 73.9 |
| — | CR | | 22.68 | 22.89 | 29.26 | 29.37 | 28.2 |
| — | Mp | | 244412 | 224566 | 275669 | 311791 | 308737 |
| — | Mw | g/mol | 197835 | 184014 | 216288 | 261822 | 234819 |
| — | Mn | g/mol | 346232 | 317659 | 410443 | 467224 | 458667 |
| — | D | | 1.750 | 1.726 | 1.898 | 1.785 | 1.953 |
| Measured | Styrene | % | 28.5 | 30.6 | 30.1 | 30.9 | 29.8 |
| Measured | Vinyl | % | 63.9 | 60.2 | 62.2 | 62.2 | 62.1 |
| Measured | # of Tg's | # | 2 | 2 | 2 | 1 | 1 |
| Measured | Tg | ° C. | −26.8 | −36.9 | −31.9 | −15 | −17.1 |
| Measured | second Tg | ° C. | −2.9 | 5.2 | −0.04 | | |
| Calculated | δ (SBR) | (J/cm³)$^{0.5}$ | | | | 17.73 | 17.70 |

TABLE 2a

| | | | Example | | |
|---|---|---|---|---|---|
| | | | E4 | C1 | C2 |
| Portion 1 | Monomer charged | g | 480.54 | 557.15 | 489.74 |
| | Total Charge | g | 5090.75 | 5158.92 | 5085.8 |
| | TSC$_{measured}$ | % | 9.0243 | 3.0939 | 8.4806 |
| | TSC$_{max,Portion\ 1}$ | % | 9.439 | 10.800 | 9.630 |
| | Conversion | % | 95.60 | 28.65 | 88.07 |
| | Polymer | g | 459.4 | 159.6 | 431.3 |
| 1H-NMR | Styrene | % | 19.2 | 28.3 | 38.5 |
| 1H-NMR | Vinyl | % | 68 | 65.8 | 57.9 |
| Calc | Styrene | g | 88.2 | 45.2 | 166.1 |
| Calc | Butadiene | g | 371.2 | 114.4 | 265.3 |
| Calc | Vinyl | g | 252.4 | 75.3 | 153.6 |
| Calc | δ$_{(SBR,Portion\ 1)}$ | | 17.3 | 17.6 | 18.0 |
| Final Polymer | Monomer charged | g | 990.9 | 990.2 | 989.57 |
| | Total Charge | g | 5706.12 | 5697.38 | 5691.1 |
| | TSC$_{measured}$ | % | 17.30 | 17.47 | 17.24 |
| | TSC$_{max,Final\ polymer}$ | % | 17.366 | 17.380 | 17.388 |
| | Conversion | % | 99.6 | 100.5 | 99.1 |
| | Polymer | g | 987 | 995 | 981 |
| 1H-NMR | Styrene | % | 30.1 | 30.9 | 29.8 |
| 1H-NMR | Vinyl | % | 62.2 | 62.2 | 62.1 |
| Calc | Styrene | g | 297.1 | 307.6 | 292.4 |
| Calc | Butadiene | g | 690.0 | 687.8 | 688.8 |
| Calc | Vinyl | g | 429.2 | 427.8 | 427.7 |
| Portion 2 | Polymer | g | 527.7 | 835.7 | 549.8 |
| Calc | Styrene | g | 208.9 | 262.4 | 126.3 |
| Calc | Butadiene | g | 318.8 | 573.3 | 423.5 |
| Calc | Vinyl | g | 176.8 | 352.5 | 274.1 |
| Calc | Styrene | % | 39.59 | 31.40 | 22.98 |
| Calc | Vinyl | % | 55.45 | 61.48 | 64.73 |
| Calc | δ$_{(SBR,Portion\ 2)}$ | (J/cm³)$^{0.5}$ | 18.0 | 17.8 | 17.5 |
| Compatibility of the 2 portions in the SSBR chain | | | | | |
| Calc | \|δ$_{(SBR,Portion\ 1)}$-δ$_{(SBR,Portion\ 2)}$\| | (J/cm³)$^{0.5}$ | 0.70 | 0.12 | 0.52 |
| Are both portions of the SSBR chain compatible? | | | no | YES | YES |

TABLE 2a-continued

| | | | Example | | |
|---|---|---|---|---|---|
| | | | E4 | C1 | C2 |
| Diff Styrene content I(Portion 1-Portion 2)I | | % | 20.4 | 3.1 | 15.5 |
| | $\delta_{(cis\text{-}BR)}$ | $(J/cm^3)^{0.5}$ | 16.97 | 16.97 | 16.97 |
| Calc | $I\delta_{(SBR,Portion\ 1)}\text{-}\delta_{(cis\ BR)}I$ | $(J/cm^3)^{0.5}$ | 0.36 | 0.66 | 1.02 |
| Is portion 1 of the SSBR chain with cis-BR compatible? | | | YES | YES | no |
| Calc | $I\delta_{(cis\text{-}BR)}\text{-}\delta_{(SBR,Portion\ 2)}I$ | $(J/cm^3)^{0.5}$ | 1.06 | 0.78 | 0.50 |
| Is portion 2 of the SSBR chain with cis-BR compatible? | | | no | no | YES |
| Weight ratio of Portion 1 in total Polymer | | % | 46.5 | 16.0 | 44.0 |

TABLE 2b

| | | | Example | | |
|---|---|---|---|---|---|
| | | | E4 | C1 | C2 |
| Polymer Chain Structure | | | | even styrene along polymer chain | compatible blocks |
| Styrene in Portion1 - Styrene in Portion2-Functionalization | | | 20-40-F | 30-F | 40-20-F |
| Portion 1 | Styrene content in % | | 20 | 30 | 40 |
| Portion 2 | Styrene content in % | | 40 | 30 | 20 |
| Coupling | | | yes | yes | yes |
| Chain end functionalization yes/no | | | yes | yes | yes |
| Weight Ratio Part1:Part2 | | | 50:50 | 100 | 50:50 |
| Results Final Polymer | | | | | |
| — | ML1 + 4 | MU | 69.1 | 69.3 | 73.9 |
| — | CR | | 26.3 | 29.37 | 28.2 |
| — | Mp | | 317012 | 311791 | 308737 |
| — | Mw | g/mol | 212653 | 261822 | 234819 |
| — | Mn | g/mol | 439204 | 467224 | 458667 |
| — | D | | 2.065 | 1.785 | 1.953 |
| Measured | Styrene | % | 30.1 | 30.9 | 29.8 |
| Measured | Vinyl | % | 62.2 | 62.2 | 62.1 |
| Measured | # of Tg's | # | 2 | 1 | 1 |
| Measured | Tg | °C. | −20.7 | −15 | −17.1 |
| Measured | second Tg | °C. | −11.7 | | |
| Calculated | δ (SBR) | $(J/cm^3)^{0.5}$ | | 17.73 | 17.70 |

Figure 2:
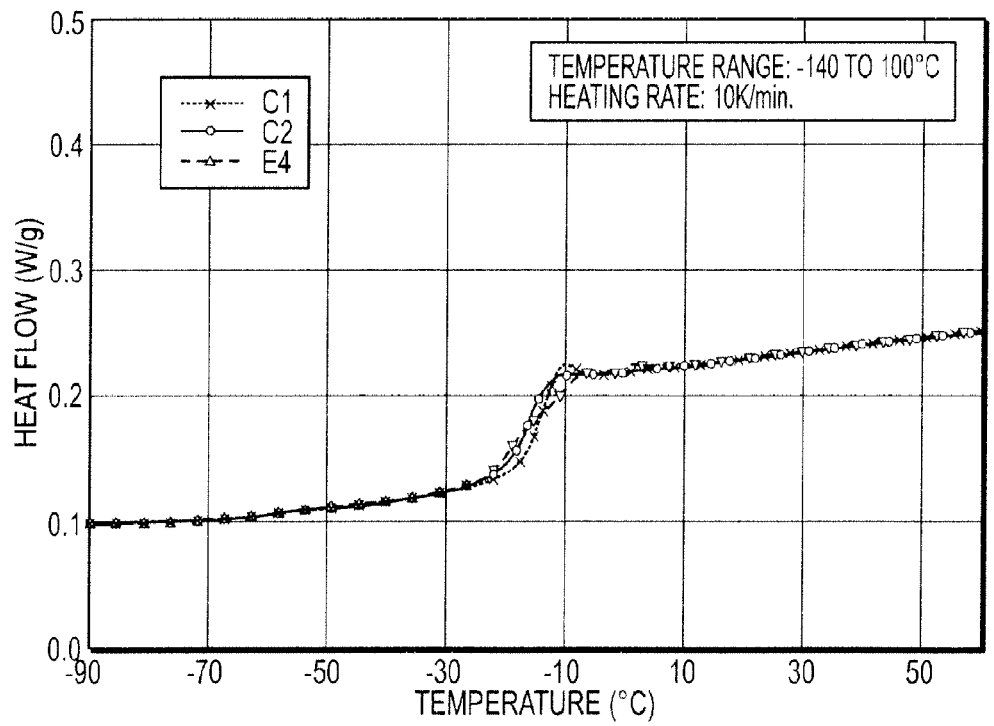
FIG. 2 shows the glass transition behavior of the styrene butadiene rubber of polymer comparisons 1-2 (C1-C2) and polymer examples 4 (E4).

FIGS. 1-2 contain the glass transition behavior of the different styrene butadiene rubbers of polymer comparisons 1-2 (C1-C2) and polymer examples 1-4 (E1-E4). As shown in the figures, the polymer comparisons show only one glass transition temperature while the polymer examples show more than one glass transition temperature. This indicates that polymer comparison 1 has a structure of evenly distributed units of styrene and vinyl as shown in FIG. 1. It also indicates that polymer comparison 2 has only compatible portions despite the different styrene/vinyl compositions of each part as shown in FIG. 2. In contrast, polymer examples 1-4 have at least two incompatible parts of varying styrene/vinyl composition as shown in FIGS. 1 and 2.

Polymer Formulations

Formulations were prepared using polymer examples E1-E3 and polymer comparison (C1) sample in a mixture with natural rubber SMR10 in a ratio of 50 wt %:50 wt % as the elastomeric polymer with the ingredients according to Table 3 below.

Formulations were prepared using polymer examples E4 and polymer comparison (C1 and C2) in a mixture with high cis polybutadiene cis-BR in a ratio of 50 wt %:50 wt % as the elastomeric polymer with the ingredients according to Table 3 below in addition.

All the formulations were made by combining and compounding the constituents in a "380 cc Banbury mixer." Formulations were vulcanized at 160° C. for t95 minutes (t95 acc to ASTM D 5289-07 as the time needed to cure to 95% "conversion," and t95 ranges from 10 to 22 minutes), for determination of tensile properties, and vulcanized at 160° C. for t95+5 minutes for all other tests. All amounts were based on phr rubber (here, rubber=amount styrene-butadiene plus, if present, the amount natural rubber or polybutadiene, both components=100 weight units). As known in the art, "phr" refers to "parts per hundred rubber." The polymerized rubber was used in the in combination with natural rubber in a weight ratio of 50% to 50% in the first formulation and with cis polybutadiene in a weight ratio of 50% to 50% in the second formulation.

TABLE 3

| Compounding | Amount (phr) |
|---|---|
| 1st Stage | |
| Elastomeric polymer sample | 100 |
| IRB 7 (international reference carbon black, Sid Richardson) | 100 |
| Stearic acid | 3.0 |
| Zinc oxide | 6.0 |
| Extender oil (VivaTec500) | 10.0 |
| Ozone wax (Antilux 654) | 3 |
| 2nd Stage | |
| Sulfur | 3.5 |
| TBBS | 2 |

The vulcanized formulations made with E1-E3 and C1 and NR as second rubber according to Table 3 were tested and the results are shown in table 4 below. The vulcanized formulations made with E4 and C1-C2 and BR as second rubber according to Table 3 were tested and the results are shown in table 5 below.

TABLE 4

| Example second used rubber | | E1 NR | E2 NR | E3 NR | C1 NR | C1 NR |
|---|---|---|---|---|---|---|
| Physical properties | | | | | | |
| Tensile strength | MPa | 23.0 | 23.1 | 23.3 | 24.9 | 23.9 |
| Elongation @ break | % | 506 | 501 | 513 | 527 | 516 |
| Modulus 100 | MPa | 2.7 | 2.8 | 2.6 | 2.7 | 2.7 |
| Modulus 300 | MPa | 12.3 | 12.6 | 11.9 | 12.6 | 12.8 |
| Mod. 300 – Mod. 100 | MPa | 9.6 | 9.8 | 9.3 | 9.9 | 10.0 |
| Hardness Shore A @ 23° C. | | 61.7 | 62.5 | 61.9 | 61.1 | 61.9 |
| Tear strength with grain | Nmm | 48.6 | 41.5 | 53.1 | 48.7 | 50.2 |
| Tear strength accross grain | Nmm | 52.1 | 37.5 | 46.5 | 43.8 | 56.6 |

| Example | | E1 | E2 | E3 | C1 | C1 |
|---|---|---|---|---|---|---|
| Tear strength Average | Nmm | 50.4 | 39.5 | 49.8 | 46.3 | 53.4 |
| DIN abrasion, 0.5 kg load | mm³ | 142 | 140 | 143 | 136 | 149 |
| Dynamic performance | | | | | | |
| HBU sample | ° C. | 83.8 | 80.2 | 82.2 | 82.3 | 84.6 |
| HBU holder | ° C. | 33.4 | 34.7 | 34.6 | 34.4 | 35.2 |
| Rolling resistance predictor | | | | | | |
| tan d @ 60° C. | | 0.0866 | 0.0903 | 0.0925 | 0.0918 | 0.0878 |
| tan d @ 70° C. | | 0.0772 | 0.0818 | 0.0817 | 0.0786 | 0.0767 |
| Rebound resilience @ 60° C. | % | 60.0 | 56.6 | 54.0 | 59.8 | 59.6 |
| Grip predictor | | | | | | |
| tan d @ 0° C. | | 0.2927 | 0.1451 | 0.2174 | 0.6935 | 0.6844 |
| tan d @ 20° C. | | 0.2784 | 0.5110 | 0.3350 | 0.1731 | 0.1852 |
| Rebound resilience @ 0° C. | % | 16.2 | 21.8 | 19.4 | 9.8 | 9.8 |
| Rebound resilience @ 23° C. | % | 20.6 | 15.2 | 17.6 | 27.6 | 27.6 |
| tan d @ 20° C.-tan @ 60° C. | | 0.1918 | 0.4207 | 0.2425 | 0.0813 | 0.0974 |
| tan d @ 20° C.-tan @ 70° C. | | 0.2012 | 0.4292 | 0.2533 | 0.0945 | 0.1085 |

TABLE 5

| Example Second Used Rubber | | C1 cis-BR | C1 cis-BR | C2 cis-BR | E4 cis-BR |
|---|---|---|---|---|---|
| Physical properties | | | | | |
| Tensile strength | MPa | 18.76 | 16.42 | 18.45 | 16.73 |
| Elongation @ break | % | 468 | 436 | 461 | 428 |
| Modulus 100 | MPa | 2.08 | 2.19 | 2.13 | 2.15 |
| Modulus 300 | MPa | 9.71 | 10.12 | 9.73 | 10.2 |
| Mod. 300 – Mod. 100 | MPa | 7.63 | 7.93 | 7.6 | 8.05 |
| Hardness Shore A @ 23° C. | | 60.3 | 58.9 | 60.5 | 59.1 |
| Tear strength with grain | Nmm | 20.7 | 18.7 | 19.5 | 21.1 |
| Tear strength accross grain | Nmm | 32.3 | 20.5 | 28.1 | 23.1 |
| Tear strength Average | Nmm | 26.5 | 19.6 | 23.8 | 22.1 |
| DIN abrasion, 0.5 kg load | mm³ | 79 | 88 | 80 | 85 |
| Dynamic performance | | | | | |
| HBU sample | ° C. | 86.2 | 86.7 | 88.1 | 85.3 |
| HBU holder | ° C. | 38.2 | 37.2 | 38.4 | 36.9 |
| Rolling resistance predictor | | | | | |
| tan d @ 60° C. | | 0.0920 | 0.0896 | 0.0914 | 0.0897 |
| tan d @ 70° C. | | 0.0792 | 0.0755 | 0.0844 | 0.0800 |
| Rebound resilience @ 60° C. | | 62.4 | 63.8 | 62.2 | 60.6 |
| Grip predictor | | | | | |
| tan d @ 0° C. | | 0.1594 | 0.1558 | 0.1555 | 0.1754 |
| tan d @ 20° C. | | 0.1231 | 0.1222 | 0.1249 | 0.1317 |
| Rebound resilience @ 0° C. | % | 29.8 | 31.6 | 30.6 | 28.2 |

TABLE 5-continued

| Example<br>Second used Rubber | | C1<br>cis-BR | C1<br>cis-BR | C2<br>cis-BR | E4<br>cis-BR |
|---|---|---|---|---|---|
| Rebound resilience @ 23° C. | % | 52 | 52.2 | 51.8 | 50 |
| Grip - Rolling resistance balance | | | | | |
| tan d @ 20° C.- tan @ 60° C. | | 0.0311 | 0.0326 | 0.0335 | 0.0419 |
| tan d @ 20° C.- tan @ 70° C. | | 0.0439 | 0.0467 | 0.0405 | 0.0517 |

Comparing the formulations of the inventive polymers E1, E2 and E3 with comparison C1 which contains even distributed styrene along the polymer chain it is seen, that the physical properties (e.g, TS, Moduli, Elongation, Hardness, Tear), the HBU and the DIN-abrasion are identical but the grip—rolling resistance balance (using tan delta at 20° C. and Rb at 23° C. as grip predictor and tan delta at 60° C., tan delta at 70° C. and RB at 60° C. as the lab predictor for rolling resistance), is significantly improved. Comparing the difference between tan delta at 20° C. to tan delta at 60° C. as sign for the grip-rolling resistance balance (the higher the better) the improvement of the inventive polymer is clearly to seen.

Figure 3:
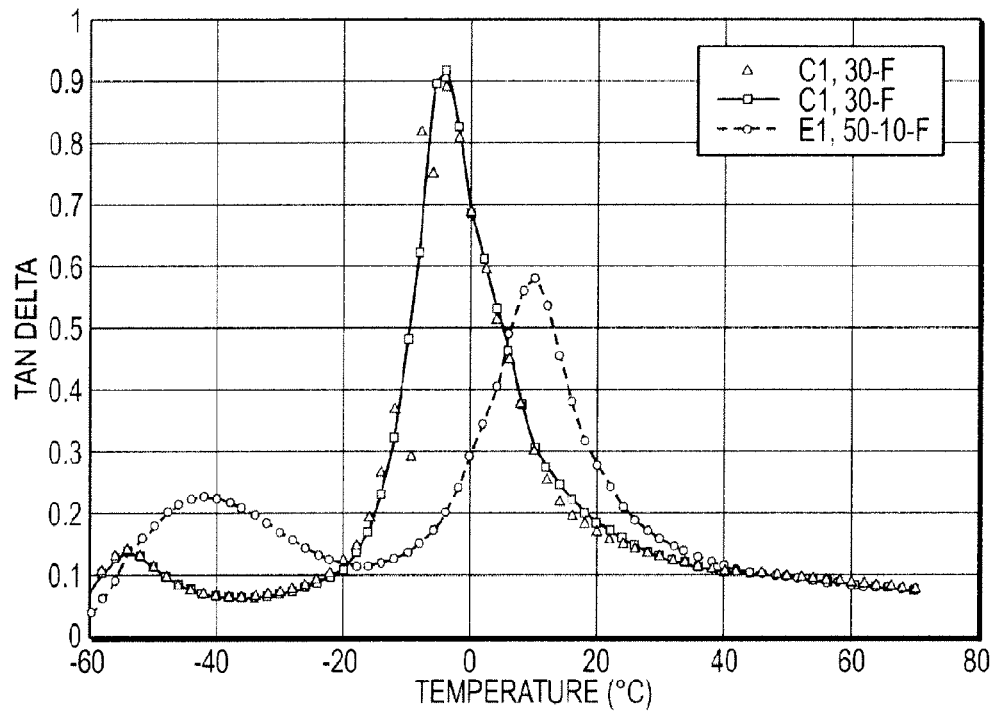
FIG. 3 shows the tan delta over a temperature range of polymer comparison 1 (C1) and polymer example 1 (E1).
Figure 4:
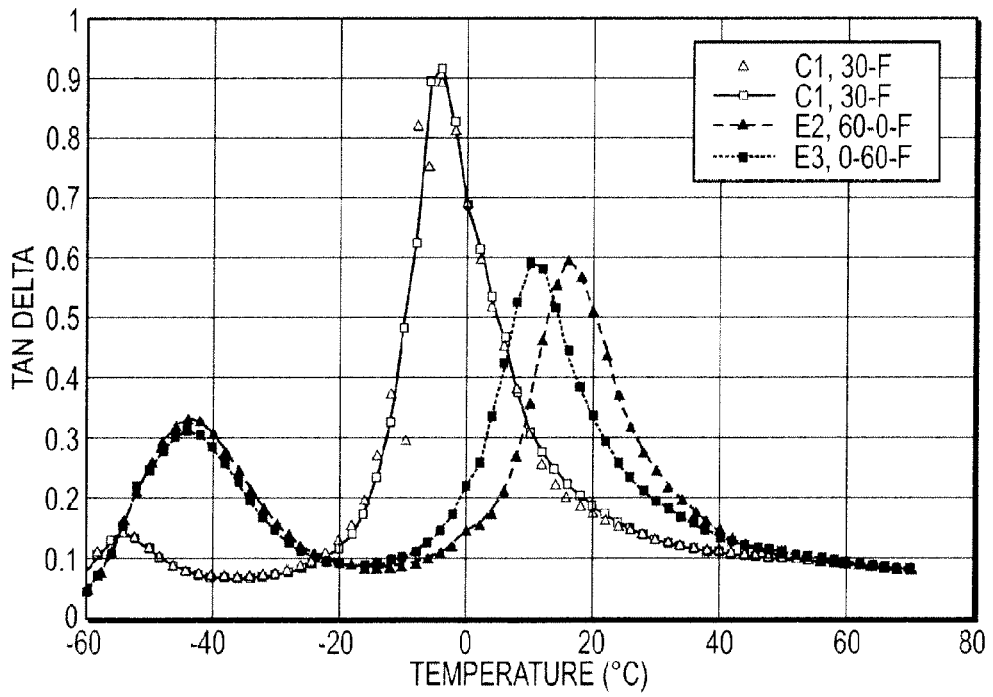
FIG. 4 shows the tan delta over a temperature range of polymer comparison 1 (C1) and polymer examples 2-3 (E2-E3).
Figure 5:
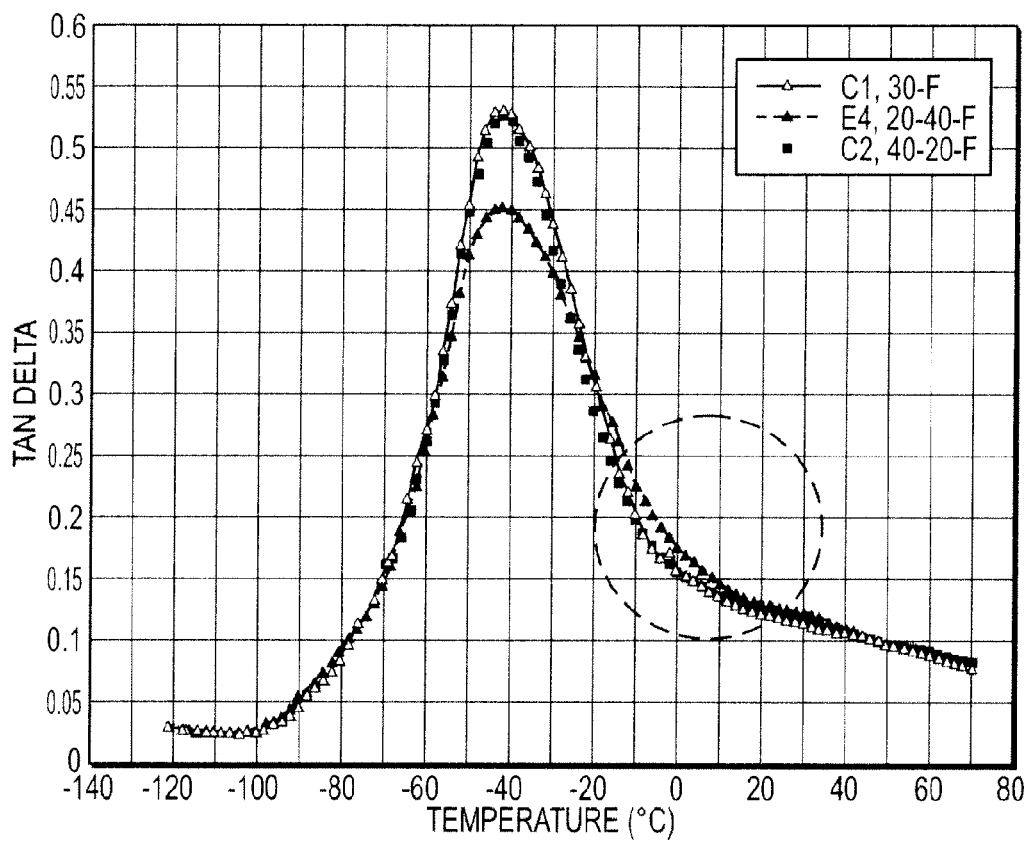
FIG. 5 shows the tan delta over a temperature range of polymer comparisons 1-2 (C1-C2) and polymer examples 4 (E4).

In addition, the tan delta course over the temperature range is shown in FIG. 3 for E1 and C1, FIG. 4 for E2, E3 versus C1, and FIG. 5 for E4 versus C1 and C2. On the other hand C2, which consists only of 2 compatible parts in the polymer chain and shows only one glass transition (FIG. 2), results in a similar compound performance (table 5) and similar tan delta course over the temperature range (FIG. 5) than C1, which contains the same styrene content but evenly distributed along the polymer chain. The improved grip-rolling resistance balance for the new inventive polymer E4 is also seen in FIG. 5 in comparison to C1 and C2.

It appears that the best grip-rolling resistance performance is obtained if the chain end modification is done on the with the second used rubber compatible portion of the polymer chain (see example 2 versus example 3) as shown in table 4 and FIG. 4.

We claim:

1. A composition comprising a styrene butadiene rubber wherein the styrene butadiene rubber is characterized before any vulcanization by the following:
   (a) two or more portions in one polymer chain which are incompatible with each other;
   (b) two or more glass transition temperatures that vary by at least about 6° C.;
   (c) two or more δ (SBR) values which differ by at least more than about 0.65 $(J/cm^3)^{0.5}$; and
   (d) two or more portions which vary in styrene content based on the total weight of each portion by at least about 20 weight percent;
   wherein the styrene butadiene rubber comprises at least a portion which is compatible with a second rubber and a portion which is not compatible with said same second rubber;
   wherein at least a portion of the styrene butadiene rubber is chain end functionalized, and
   wherein the portion of the styrene butadiene rubber that is chain end functionalized comprises less styrene content than a portion of the styrene butadiene rubber that is not chain end functionalized.

2. The composition of claim 1 wherein the styrene butadiene rubber is characterized by (b) two or more glass transition temperatures that vary by at least about 8° C.

3. The composition of claim 1 wherein the styrene butadiene rubber is characterized by (b) two or more glass transition temperatures that vary by at least about 9° C.

4. The composition of claim 1 wherein the styrene butadiene rubber is coupled in an amount up to 40% by weight based on the total weight of the rubber as determined by size exclusion chromatography.

5. The composition of claim 1 wherein the styrene butadiene rubber is characterized by a ML 1+4 of from about 20 to about 120 at 100° C.

6. The composition of claim 1 wherein the styrene butadiene rubber comprises a portion in the polymer chain which comprises a styrene content of from about 0 to about 27 weight percent based on the total weight of the first portion and a second portion in the polymer chain which comprises a styrene content of from about 21 to about 70 weight percent based on the total weight of the second portion.

7. The composition of claim 1 which comprises a first portion in the polymer chain which is incompatible with a second portion in the polymer chain wherein the weight ratio of said first portion to said second portion is from about 90:10 to about 10:90.

8. The composition of claim 1 which further comprises a second rubber compound.

9. A vulcanized composition comprising the styrene butadiene rubber of claim 1 and at least one other rubber wherein:
   (1) the absolute value of the difference between the solubility parameter δ (rubber) and the solubility parameter δ (SSBR, portion i) of at least one portion of styrene butadiene rubber of claim 1 is lower than about 0.65 $(J/cm^3)^{0.5}$ and;
   (2) the absolute value of the difference between the solubility parameter δ (rubber) and the solubility parameter δ (SSBR, portion j) of at least one portion of styrene butadiene rubber of claim 1 is higher than about 0.65 $(J/cm^3)^{0.5}$.

10. The composition of claim 8 wherein said second rubber compound is selected from the group consisting of natural rubber, cis-polybutadiene, emulsion polymerized styrene-butadiene rubber, high vinyl polybutadiene, and mixtures thereof.

11. The composition of claim 1 which further comprises at least one filler.

12. The composition of claim 11 wherein the filler comprises carbon black or silica.

13. The composition of claim 1 wherein the composition is vulcanized.

14. The composition of claim 13 wherein upon vulcanization the vulcanized composition is characterized by at least two maxima in the tan delta course with the temperature.

15. The composition of claim 1 wherein for the (d) two or more portions which vary in styrene content based on the total weight of each portion by at least about 20 weight percent, the portion with the higher styrene content has a lower vinyl content than the portion with the lower styrene content.

16. The composition of claim 1 wherein the styrene butadiene rubber does not include isoprene and is characterized by (b) only two glass transition temperatures that vary by at least about 6° C.

17. The composition of claim 1, wherein the styrene-butadiene rubber is characterized by (d) two or more portions each comprising styrene and butadiene and which vary in styrene content, based on the total weight of each portion, by at least about 20 weight percent.

* * * * *